United States Patent [19]
Yoshimura et al.

[11] Patent Number: 5,691,977
[45] Date of Patent: Nov. 25, 1997

[54] VIRTUAL CHANNEL CONVERTER AND VCC TABLE ACCESS METHOD

[75] Inventors: Shuji Yoshimura; Satoshi Kakuma; Masami Murayama; Shiro Uriu; Tadashi Hoshino, all of Kanagawa, Japan

[73] Assignee: Fujitsu Limited, Kanagawa, Japan

[21] Appl. No.: 580,534

[22] Filed: Dec. 29, 1995

Related U.S. Application Data

[63] Continuation of Ser. No. 216,526, Mar. 21, 1994, abandoned.

[30] Foreign Application Priority Data

Sep. 20, 1993 [JP] Japan .................. 5-233462

[51] Int. Cl.⁶ .................................................. H04L 12/56
[52] U.S. Cl. ................... 370/250; 370/392; 370/399; 370/418; 340/825.52
[58] Field of Search ................. 340/825.5, 825.51, 340/825.52; 395/180, 181, 182.01, 182.02; 370/242, 244, 250, 389, 392, 395, 398, 399, 412, 418

[56] References Cited

U.S. PATENT DOCUMENTS

| | | | |
|---|---|---|---|
| 3,725,593 | 4/1973 | Palombari | 370/16 |
| 4,803,681 | 2/1989 | Takahashi | 370/85.2 |
| 5,062,106 | 10/1991 | Yamazaki et al. | 370/94.1 |
| 5,084,867 | 1/1992 | Tachibana et al. | 370/60 |
| 5,119,369 | 6/1992 | Tanabe et al. | 370/60 |
| 5,271,010 | 12/1993 | Miyake et al. | 370/60 |
| 5,295,134 | 3/1994 | Yoshimura et al. | 370/16 |
| 5,313,453 | 5/1994 | Uchida et al. | 370/13 |

*Primary Examiner*—Alpus H. Hsu
*Attorney, Agent, or Firm*—Helfgott & Karas, P.C.

[57] ABSTRACT

In a data access device for writing into or read from a data conversion table on the basis of a clock signal extracted from a cell being transferred over a line, a clock signal generator of the invention generates a second clock signal which differs from the first clock signal extracted from an incoming cell. A write/read control unit writes data into or reads data for maintenance from the data conversion table on the basis of either the first clock signal or the second clock signal when the line is normal. In the event of the occurrence of a failure in the line, on the other hand, the write/read control circuit permits the data conversion table to be written into or read from for maintenance on the basis of the second clock signal.

26 Claims, 12 Drawing Sheets

FIG.8A CK1
FIG.8B CF
FIG.8C Data
FIG.8D EN

VIRTUAL CHANNEL CONVERTER AND VCC TABLE ACCESS METHOD

This is a continuation of application Ser. No. 08/216,526, filed Mar. 21, 1994, now abandoned.

BACKGROUND OF THE INVENTION

1. Field of the Invention

The present invention relates to a data access device with a data conversion table and a data access method therefor.

2. Description of the Related Art

A virtual channel converter (VCC) for use in an ATM (Asynchronous Transfer Mode) exchange or switching unit has a facility of converting input virtual path identifier/ virtual channel identifier of an incoming ATM cell to output virtual path identifier/virtual channel identifier (hereinafter referred to as VPI/VCI) using a VCC table. Access to this VCC table is made to write VPI/VCI data at the time of setup of a path, to read out output VPI/VCI data corresponding to VPI/VCI data added to an incoming ATM cell to the ATM exchange, or to read out VPI/VCI data for maintenance.

Here, an arrangement of a virtual channel converter related with the present invention will be described with reference to FIG. 1. An address selector 11 makes a selection among VPI/VCI data added to an ATM cell, VPI/VCI data at the time of setup of a path, and VPI/VCI data to be read out for maintenance as a write/read address of a VCC table in a RAM 12.

That is, input VPI/VCI data selected by the address selector 11 is applied to the RAM 12 as a write/read address. In data readout operation, data stored in the location of the VCC table specified by that address, i.e., output VPI/VCI data, is read out. In the writing into the VCC table, on the other hand, output VPI/VCI data is written into its location specified by that address.

A header conversion selector 13 selects either of VPI/VCI data of an incoming cell temporarily stored in a buffer 14 and output VPI/VCI data read from the VCC table of RAM 12 and then outputs it in combination with other portions of that cell.

In conversion of VPI/VCI data of an incoming cell, output VPI/VCI data read from the VCC table is selected by the header conversion selector 13 and then sent over a line in place of the input VPI/VCI data in the header of that cell. Thereby, the input VPI/VCI data in the cell header is converted into corresponding output VPI/VCI data.

For the VCC table which associates input VPI/VCI data of a cell with output VPI/VCI data, a memory area is needed, in which the address is 28 bits in length and 28 bits of data can be stored because the VPI/VCI data has a total of 28 bits. However, the provision of such a memory area which needs the address length of 28 bits and the data length of 28 bits in each virtual channel converter is not feasible. Therefore, a limit is imposed on the number of pieces of VPI/VCI data which are allowed to be simultaneously present on a line so as to keep down the capacity of the VCC table memory.

FIG. 2 is a block diagram of the other conventional virtual channel converter. FIG. 3 shows an arrangement of the register of FIG. 2.

In FIG. 2, a register section 21 can store 32 pieces of input VPI/VCI data, and a RAM 22 can store 32 pieces of output VPI/VCI data corresponding to the respective input VPI/ VCI data. To the register section 22 are applied register numbers (Reg. No.) indicating empty ones of 32 registers and input VPI/VCI data at the time of setup of input VPI/VCI data. The input VPI/VCI data are written into the empty registers. At the same time, output VPI/VCI data are written into the corresponding addresses in the RAM 22.

The VPI data of a cell being transferred over a line is stored in a register (flip-flop) 23a, while the VCI data is stored in a register 23b. The VPI/VCI data stored in the registers 23a and 23b are output to the register section 21 where a decision is made as to whether or not it matches input VPI/VCI data stored in the register section 21. When a match is found between the VPI/VCI data of the cell being transferred over the line and the input VPI/VCI data stored in the register section 21, a predetermined address of the RAM 22 is designated, so that the output VPI/VCI data is read from that address and sent to the header converter 24. In the header converter 24, the input VPI/VCI data of that cell is converted into the output VPI/VCI data.

The register section 21 is constructed, as shown in FIG. 3, from 32 registers 31-1 to 31-32 each of which store 28-bit input VPI/VCI data, 32 Exclusive OR gates (hereinafter referred to as EXORs) for matching VPI/VCI data of a cell being transferred over a line against VPI/VCI data stored in the registers 31-1 to 31-32, and an encoder 33 for encoding outputs of the 32 EXORs 32-1 to 32-32 to provide a 5-bit RAM address.

For example, when the VPI/VCI data of a cell traveling over the line matches the VPI/VCI data stored in the first register 31-1, two inputs to the first EXOR 32-1 match, providing an output 0. At this point, the other EXORs 32-2 to 32-32 provide an output 1. Thus, the encoder 33 encodes the output value "0111 1" as a 5-bit RAM address, e.g., "00001". As a result, output VPI/VCI data stored in the address "00001" of the RAM 22 is read out.

In the virtual channel converter of FIG. 1, in addition to the data reading process for converting the VPI/VCI data of an incoming cell to output VPI/VCI data, the writing of VPI/VCI data for making sure that the VCC table is normal or the reading of VPI/VCI data for maintenance is performed. These processes are performed, under the instructions of software in the exchange, asynchronously with the process of converting the VPI/VCI data of an incoming cell to output VPI/VCI data.

In this case, the incoming cell VPI/VCI data conversion process should take priority over the other processes. In the prior art system, therefore, when a request to read VPI/VCI data is issued from the line side, the writing of data into the VCC table or the reading of data from the table for maintenance is placed in the wait state.

In the above-described access method, the VCC table is written into or read from on the basis of a clock signal extracted from a cell being sent over a line. For this reason, in case where the line is not connected or where a clock signal cannot be extracted due to the occurrence of a failure in the line, there arises a problem that VPI/VCI data cannot be written into the VCC table or data cannot be read from the table for maintenance.

In the virtual channel converter of FIG. 2, when directed by software in the exchange to write or read VPI/VCI data into or from the register section 21, firmware is required to make a decision as to whether the direction is to set up a path (i.e., to write new VPI/VCI data) or to clear existing VPI/ VCI data. When a path is to be set up, a check is made as to which of registers in the register section 21 are empty. Input VPI/VCI data is written into an empty register and output VPI/VCI data is written into that address of the RAM 22 which corresponds to the register. In the case of clearing, on the other hand, a search is made of the register section for an associated register, whereupon that resister is cleared. Heretofore, these processes were performed by firmware, which needs an appreciable amount of time and moreover limits the speed with the exchange can perform a switching process.

SUMMARY OF THE INVENTION

It is an object of the present invention to permit VPI/VCI data to be written into a VCC table for the purpose of setting a path or VPI/VCI data to be read from the VCC table for the purpose of maintenance even where a clock signal on a line cannot be extracted in the event of a failure in the line.

It is another object of the present invention, when a request to read from a conversion table is made by the line side and by other than the line side exactly or almost simultaneously, to permit the request made by the line side to be processed by priority.

It is still another object of the present invention to permit data to be written into a data conversion table and data in the data conversion table to be erased in a short period of time.

According to an aspect of the present invention, storage means stores a data conversion table. Clock signal generating means generates a second clock signal which differs from a first clock signal extracted from an incoming cell being transferred over a line. Write/read control means writes into or reads from the data conversion table on the basis of either the first clock signal or the second clock signal when a request to write into the table or a request to read from the table by other than the line side occurs and moreover the line is normal. In the event of a line failure, on the other hand, the write/read control means writes into or reads from the table on the basis of the second clock signal.

According to the other aspect of the present invention, when a request for access to the table is made by the line side exactly or almost simultaneously with a request to write into the conversion table or a request for access to the table by other than the line side, the access request by the line side is serviced by priority and subsequently the request to write into the table or the access request by other than the line side is serviced during a time interval that elapses after the request by the line side has been serviced before another access request by the line side occurs.

DETAILED DESCRIPTION OF THE PREFERRED EMBODIMENT

Hereinafter the preferred embodiments of the present invention will be described with reference to the drawings. An example of a basic arrangement of the present invention will be described first. Hereinafter, the present invention will be described as being applied to a virtual channel converter in an ATM switching unit.

In converting input virtual path identifier (VPI)/virtual channel identifier (VCI), added to a cell used in an ATM switched network, into output VPI/VCI, if a request to read from a conversion table (for example, a VCC table) that associates input VPI/VCI with output VPI/VCI is made by the line side exactly or almost simultaneously with a request to write into the conversion table or a request to read from the table by other than the line side, a data conversion method of the present invention services the request by the line side by priority and then permits VPI/VCI data to be written into or VPI/VCI data to be read from for maintenance during a time interval that elapses after the request by the line side has been serviced before the next incoming cell arrives.

If a request to write into the conversion table or a request to read from the table by other than the line side and a request to read from the table by the line side overlap, the device of the present invention services the request by the line side on priority basis and then permits data to be written into the table or to be read from the line side during a time interval which elapses before another access request is made by the line side, i.e., before the next cell arrives. That is, the VPI/VCI data conversion is performed by priority, thus eliminating delays for connections in the switching process.

Figure 4:
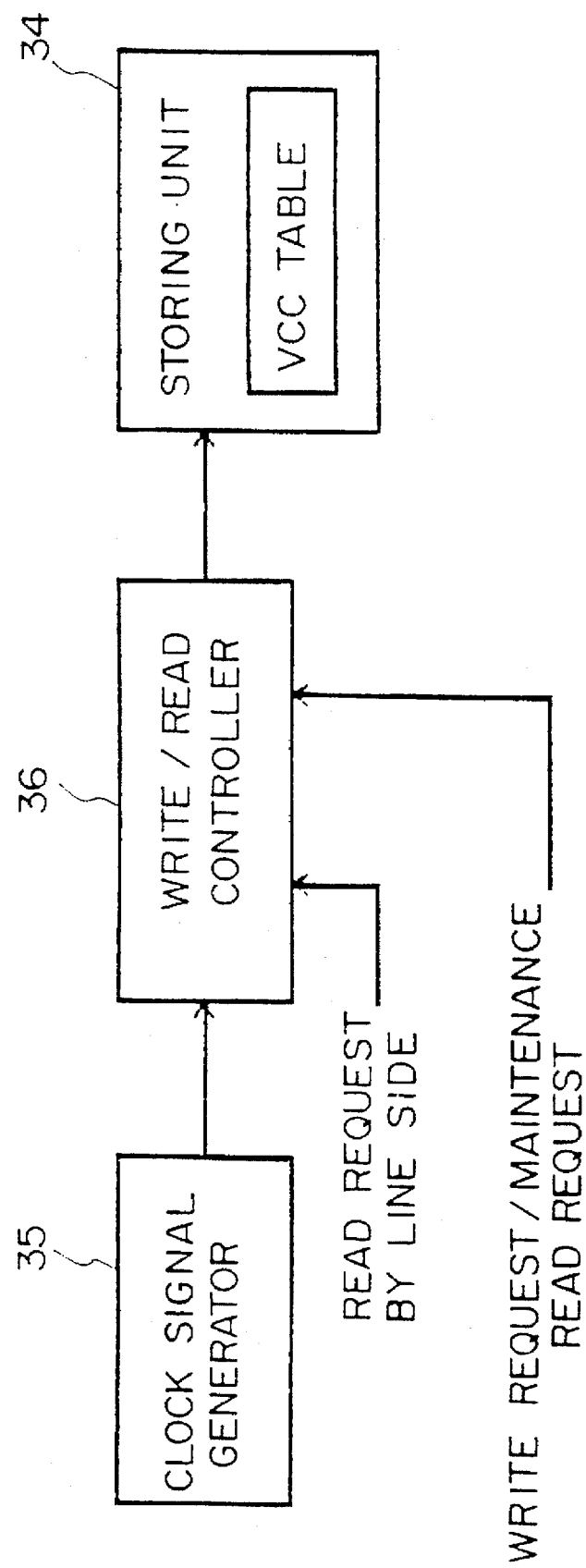
FIG. 4 illustrates an example of a basic arrangement of the present invention.

FIG. 4 illustrates one example of a basic arrangement of a virtual channel converter which converts input VPI/VCI added to an incoming cell to output VPI/VCI.

In this figure, a storage unit 34 stores a VCC table that associates input VPI/VCI with output VPI/VCI defined for the input VPI/VCI.

A clock signal generator 35 generates a second clock signal which is different from a first clock signal extracted from a cell being sent over a line.

A write/read controller 36 writes data into or read data from the VCC table on the basis of the first clock signal extracted from a cell being sent over the line or the second clock signal generated by the clock signal generator 35 when there is a data write request or a data read request by other than the line side and the line is normal. If, on the other hand, there is a data write request or a data read request by other than the line side, but a failure has occurred in the line, then the write/read controller 36 writes data into or reads data from the VCC table on the basis of the second clock signal.

When a VPI/VCI data read request is made by the line side exactly or almost simultaneously with a VPI/VCI data write request for path setting or a VPI/VCI data read request for maintenance, the write/read controller 36 services the read request by the line side on priority basis and subsequently performs the writing of VPI/VCI data into the table for the purpose of setting a path or the reading of VPI/VCI data from the table for the purpose of maintenance on the basis of the first clock signal or the second clock signal during a time interval after the request by the line side has been serviced before the next cell arrives. Further, the write/read controller 36 writes or reads VPI/VCI data into or from the VCC table on the basis of the first clock signal or the second clock signal when no VPI/VCI data read request is made by the line side, but a VPI/VCI data write request or a VPI/VCI data read request for maintenance has been generated.

The write/read controller 36 is equipped with a control signal generator which generates control signals for controlling writing into or reading from the storage unit 34.

According to the present invention, even when a clock signal (first clock signal) cannot be extracted from a cell traveling over a line because of the occurrence of a failure in the line, a second clock signal that is generated independently of the first clock signal can be used to write into or read from a conversion table (for example, a VCC table).

Thereby, even when a failure occurs in the line terminating device, no line is installed, or a failure occurs in a line to thereby disable a clock signal from being extracted from the line side, the conversion table associated with calling can be written into or read from. This permits determination of a failure as to whether it has occupied by inaccessibility to the conversion table or a failure in some other portion. Even when the first clock signal cannot be extracted as a result of a failure in the line, the second clock signal can be used to write into or read from the conversion table (VCC table).

Figure 5:
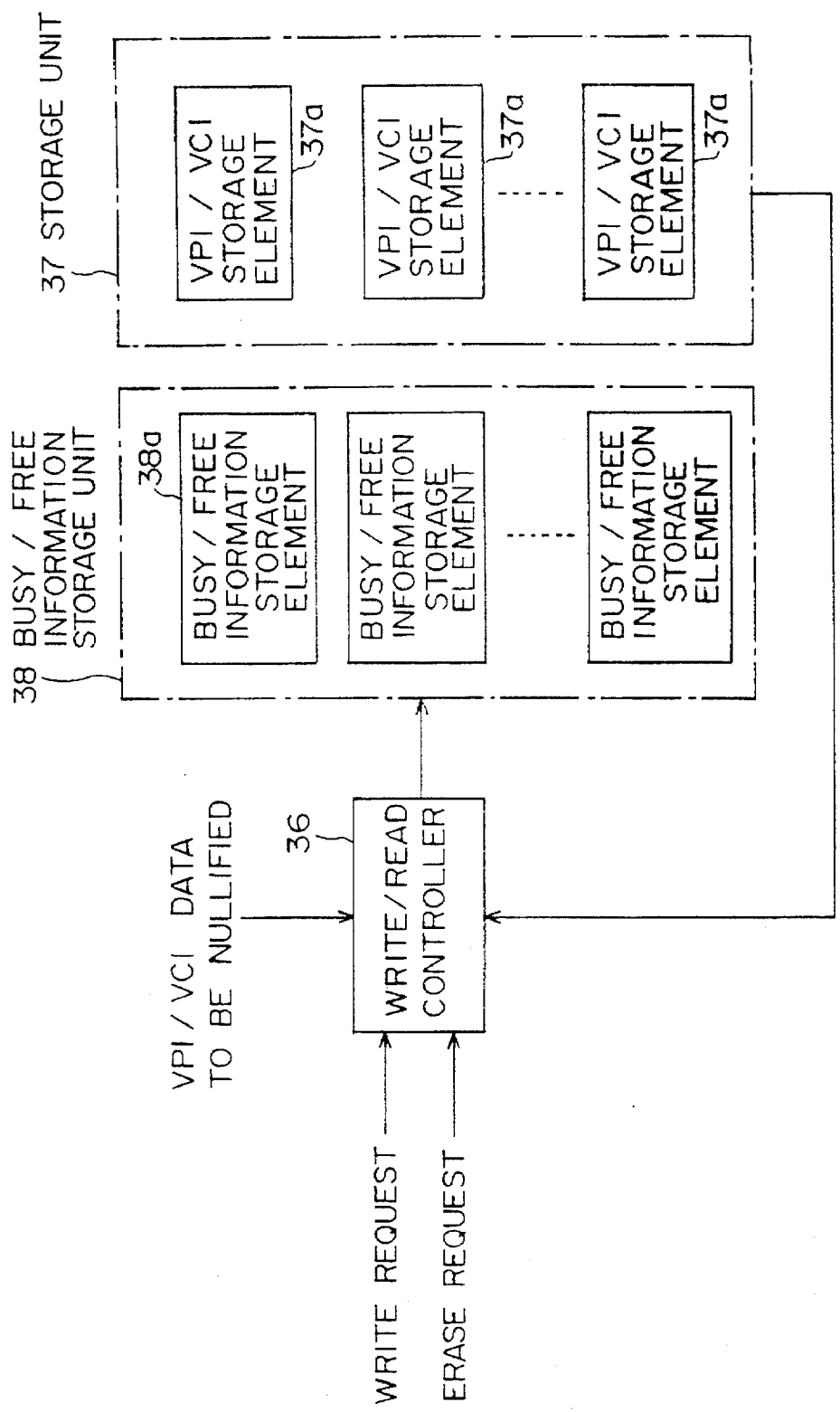
FIG. 5 illustrates another example of a basic arrangement of the present invention.

FIG. 5 illustrates a basic arrangement of another virtual channel converter according to the present invention. In the figure, a storage unit 37 comprises a plurality of VPI/VCI storage elements 37a in which input VPI/VCI and output VPI/VCI are stored with a one-to-one correspondence therebetween. The VPI/VCI storage elements 37a comprise a plurality of registers 86-1 to 86-32 (see FIG. 11) which store input VPI/VCI data added to incoming cells and a RAM which stores output VPI/VCI data corresponding to the input VPI/VCI data. The contents of the registers 86-1 to 86-32 are used to address the RAM.

A busy/free information storage unit 38 comprises a plurality of busy/free information storage elements 38a which correspond in number to the VPI/VCI storage elements 37a and store information indicating whether the corresponding VPI/VCI storage elements are busy (currently in use) or free (not currently in use).

A write/read control unit 36 responds to the presence of a VPI/VCI data write request to write enable a VPI/VCI storage element 37a corresponding to a busy/free information storage element 38a that stores information indicating being free. When a request to nullify VPI/VCI data occurs, on the other hand, the write/read control unit 36 searches the storage unit 37 for a VPI/VCI storage element 37a that stores data which agrees with the VPI/VCI data to be nullified and then rewrites information in the busy/free information storage element 38a corresponding to that VPI/VCI storage element 37a by information indicating being free.

Thereby, the process of searching for a free VPI/VCI storage element 38a and writing VPI/VCI data into it when a request to write VPI/VCI data occurs can be implemented by hardware, permitting the time it takes to write data to be reduced considerably. In addition, (at the termination of a cell) at the time of clearing, the time it takes to clear VPI/VCI data can also be reduced.

Figure 1:
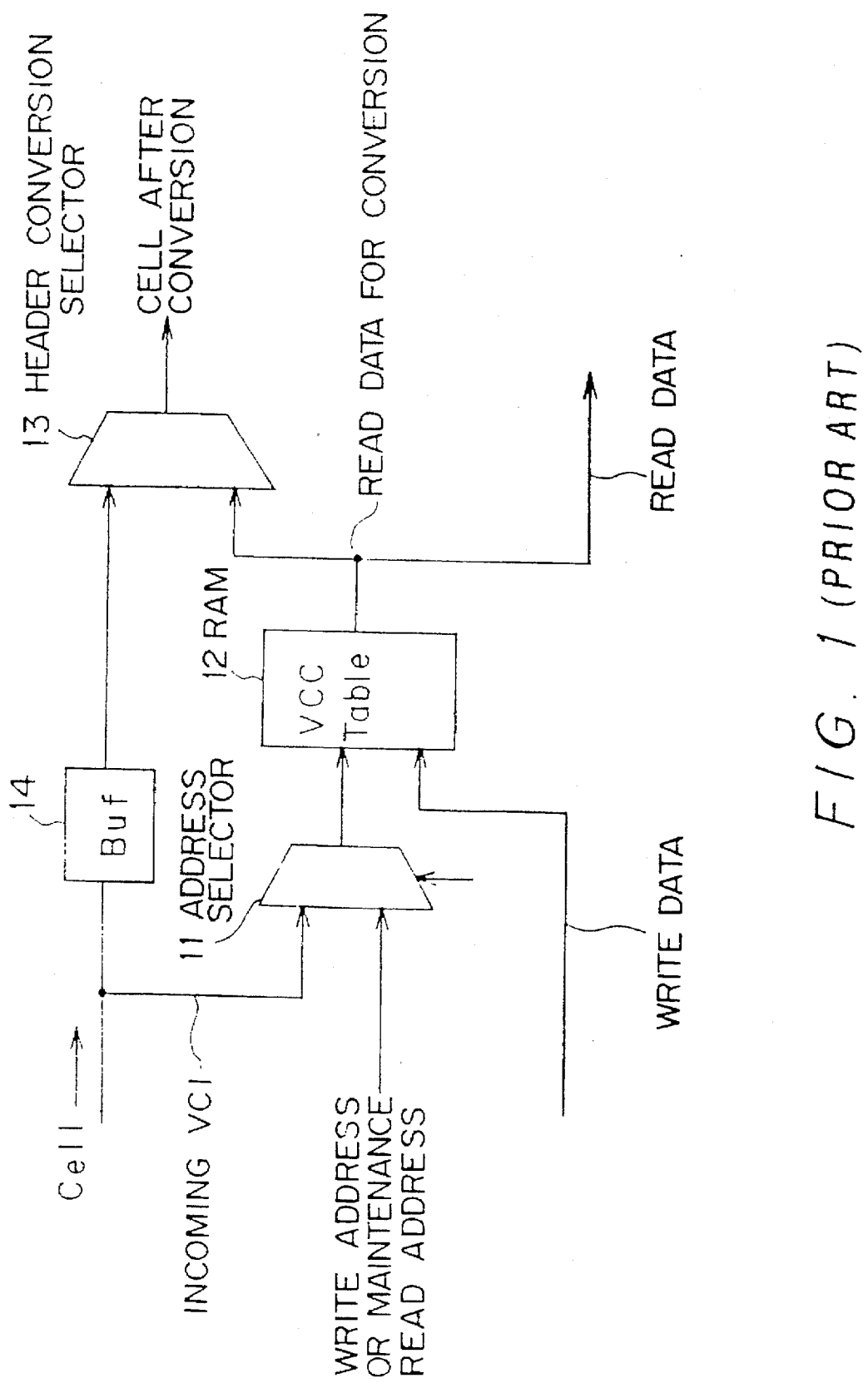
FIG. 1 is a block diagram of the main portion of a conventional virtual channel converter.
Figure 6:
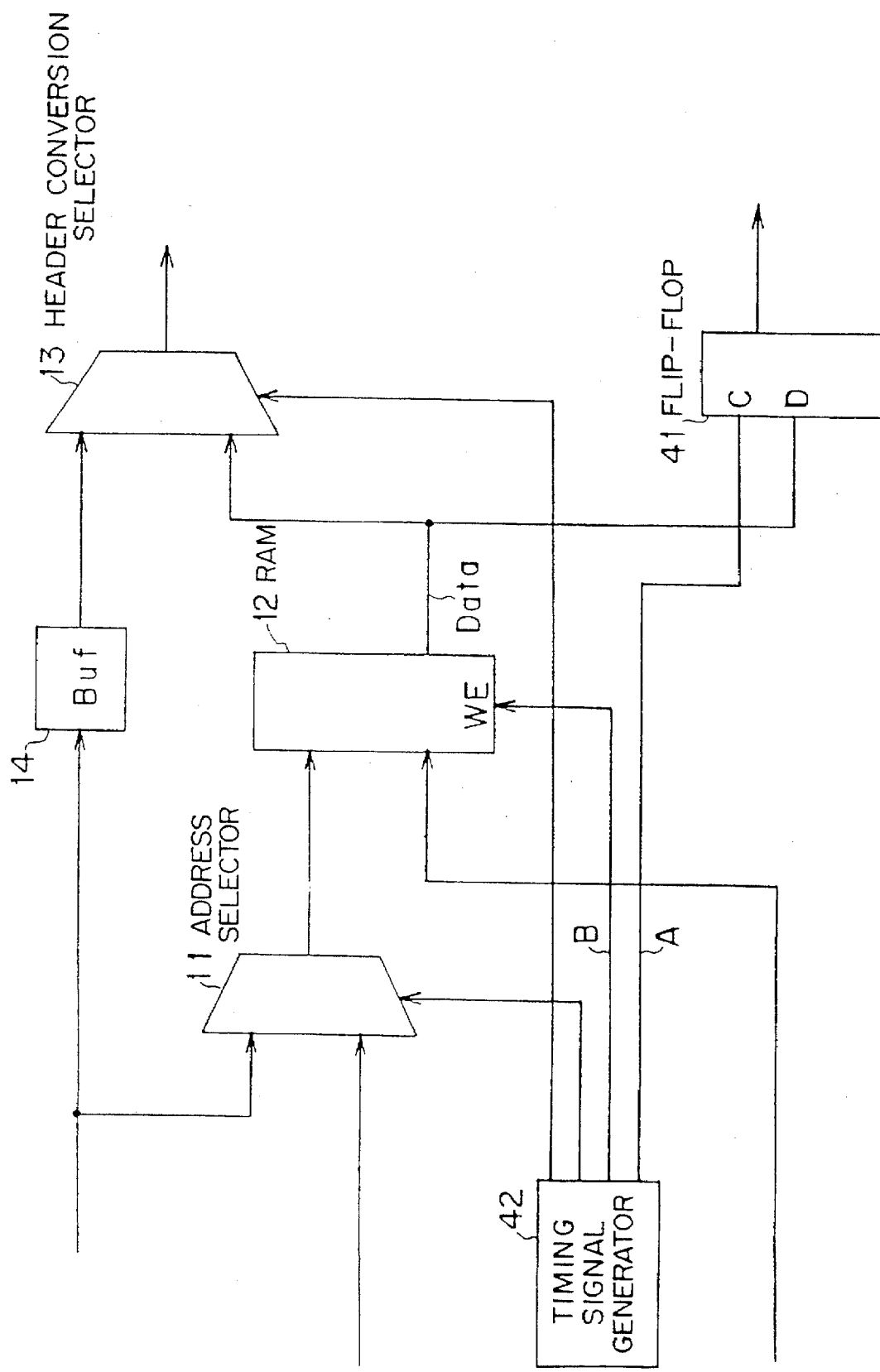
FIG. 6 is a block diagram of the main portion of a virtual channel converter according to a first embodiment of the present invention.

Next, an embodiment of the present invention will be described in conjunction with more detailed circuit diagrams. FIG. 6 is a circuit block diagram of the main portion of a virtual channel converter according to a first embodiment of the present invention. Like reference numerals are used to denote corresponding circuit blocks to those in FIG. 1 and their description will be omitted.

In FIG. 6, a flip-flop 41 serves as a register which latches VPI/VCI data read out of the VCC table in RAM 12 at maintenance time. A timing signal generator 42 generates a selection signal which instructs address selector 11 to output VPI/VCI data of a cell traveling over a line or either a write address for the path setting purpose or a read address for the maintenance purpose is to be output to RAM (Random Access Memory) 12 and a selection signal which specifies to header conversion selector 13 which of VPI/VCI data of the cell traveling over the line and output VPI/VCI data read out of the RAM 12 is to be selected. Further, the timing signal generating circuit 42 generates a write enable signal WE (signal B) to the RAM 12 and a read control signal (signal A) to the flip-flop 41 which determines the timing of the latching of VPI/VCI data from the RAM 12.

Figure 7:
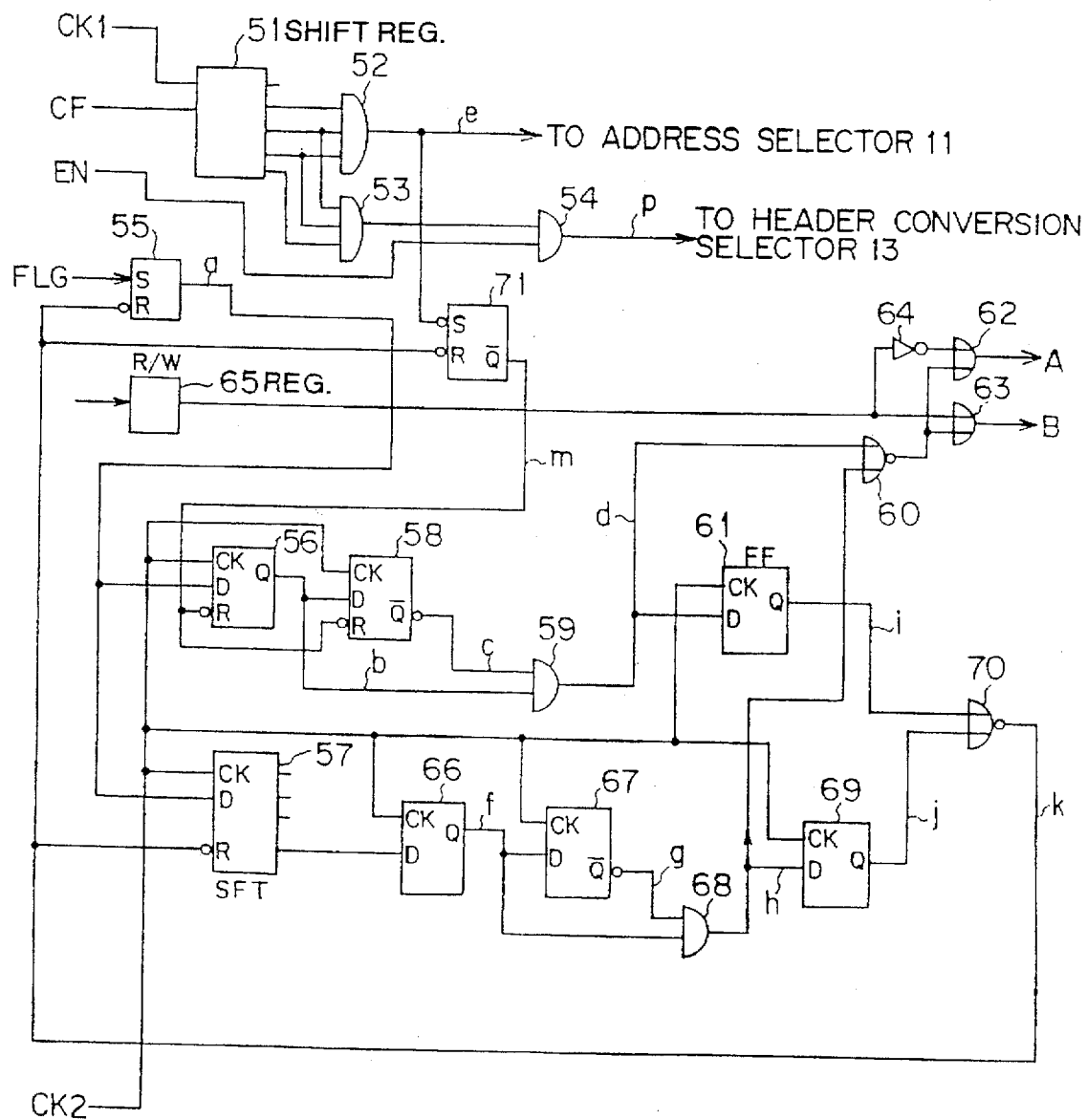
FIG. 7 shows a circuit arrangement of the timing signal generator of FIG. 6.

FIG. 7 illustrates a detailed circuit diagram of the timing signal generator 42 of FIG. 6. To a 5-bit shift register 51 applied are a clock signal CK1 of about 9 MHz extracted from a cell moving over the line and a cell frame synchronization signal CF (see FIG. 8). The cell frame synchronization signal CF is shifted in the shift register in synchronism with the clock signal CK, so that it appears at five outputs in sequence. The signals at the 2nd to 4th outputs of the shift register 51 are input to a 3-input AND gate 52, while the signals at the 3rd to 5th outputs are input to a 3-input AND gate 53.

An output signal e of the 3-input AND gate 52 is applied to the address selector 11 as a selection signal which causes the selector to select either VPI/VCI data on the line or write address/maintenance read address. The output signal e is also connected to the set terminal S of an RS flip-flop 71.

Figure 8:
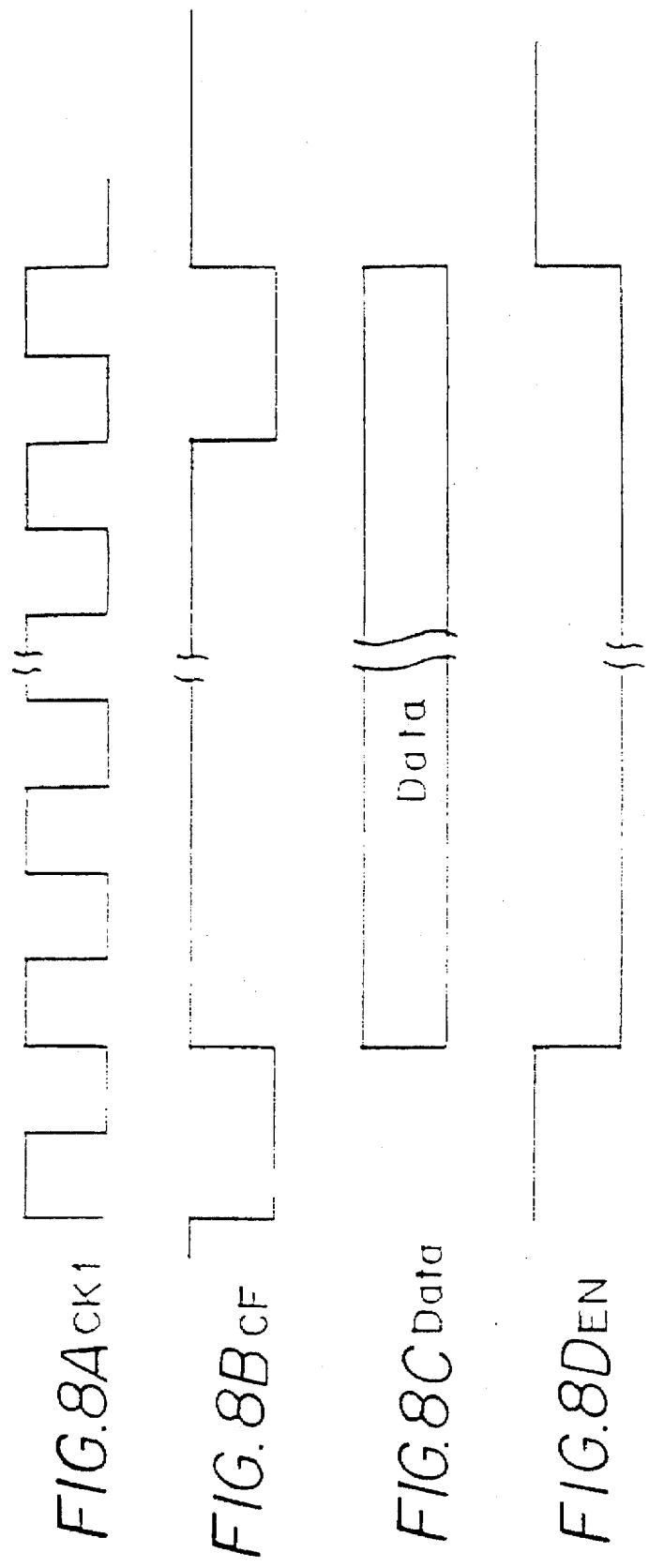
FIG. 8 is a timing diagram of a cell frame synchronizing signal and an enable signal.

An output signal of the 3-input AND gate 53 is applied via an AND gate 54 to the header conversion selector 13 as a selection signal which causes the selector to select either VPI/VCI data on the line or output VPI/VCI data read from the RAM 12. To the other input of the AND gate 54 is input an enable signal EN which, as shown in FIG. 8, is low while data is valid.

In the circuit comprised of the shift register 51, the 3-input AND gates 52, 53, and the AND gate when the cell frame synchronization signal CF goes to a low level (0), the low-level signal is sequentially shifted synchronously to a clock signal, and the output signal of the 3-input AND gate 52, i.e., the selection signal e, becomes 0 between the second clock and the third clock. When the selection signal e is 0, the address selector 11 selects VPI/VCI data added to an incoming cell moving over the line for transmission to the RAM as its read address. As a result, output VPI/VCI data associated with the input VPI/VCI data is read out of the VCC table in the RAM 12.

On the other hand, the output signal of the 3-input AND gate 53 becomes a 0 for three cycle periods from the third clock transition after the transition of the synchronization signal to 0, which causes the output signal of the AND gate 54, i.e., the selection signal p, to become 0. When the selection signal p is 0, the header conversion selector 13 selects the output VPI/VCI data from the RAM 12 and outputs it as VPI/VCI in the header of the incoming cell.

By these operations input VPI/VCI data added to an incoming cell moving over the line is converted to output VPI/VCI data.

An RS flip-flop 55 latches a flag FLG which becomes 1 at data write time or at maintenance data read time, the output signal a of which being applied to a D flip-flop 56 and a shift register 57.

To the clock terminal CK of the D flip-flop 56 is applied the clock signal CK2 generated independently of the clock signal CK1 extracted from a cell on the line. The flip-flop 56 latches the signal a from the flip-flop 55 in synchronism with the clock signal CK2 to output a signal b to a D flip-flop 58 and an AND gate 59 at their one input terminal. The flip-flop 58 latches the signal b in synchronism with the clock signal CK2 to provide an output signal c, which is the inverse of the signal b latched, to the other input terminal of the AND gate 59.

An output signal d of the AND gate 59 is applied to a NOR gate 60 and a D flip-flop 61. An output signal of the NOR gate 60 is applied to OR gates 62 and 63 at their one input. To the other input terminal of the OR gate 63 is applied a read/write signal R/W from a register 65, which becomes 1 at data read time or 0 at data write time. To the other input terminal of the OR gate 62 is applied the read/write signal R/W through an inverter 64.

An output signal B of the OR gate 62 is applied to the RAM 12 as a write enable signal WE, while an output signal A (read control signal) of the OR gate 63 is applied to the flip-flop 41 as a clock signal which allows the flip-flop to latch output VPI/VCI data read from the VCC table.

To the reset terminals R of the D flip-flops 56 and 58 is applied the inverted output signal m of the RS flip-flop 71. Accordingly, when the cell frame synchronization signal CF becomes low and the output signal e of the 3-input AND gate 52 becomes low, the RS flip-flop 71 is set, allowing the inverted output signal m to become low. When the signal m becomes low, the D flip-flops 56 and 58 are reset. Note that the clock signal CK2 applied to the clock terminals of the D flip-flops 56 and 58, the shift register 57 and D flip-flops 61 and 66 to be described later is generated independently of the clock signal CK1 extracted from cells traveling over the line and has a frequency of the order of 4 MHZ.

Here, a description will be made of the operation of the above-described circuit when it is in the initial state where the flag FLG is 0 (reset state), which is to be set at data write time or at data read time for maintenance.

In the initial state where the flag FLG is 0, the output signal a of the RS flip-flop 55 is 0. This output signal is latched by the D flip-flop 56 in synchronism with the clock signal CK2, so that the output signal b of the D flip-flop 56 is 0. At this point, therefore, the output signal of the AND gate 59 is 0. However, since the output signal b of the D flip-flop 56, that is, the other output signal of the AND gate 59 is 0, the output signal of the AND gate 58 remaining unchanged as 0.

That is, when the flag FLG is not set, the output signal d of the AND gate 59, i.e., one input signal to the NOR gate 60, is 0. Since, at this point, the other input signal to the NOR gate 60 is also 0 (the reason will be described later), the output signal of the NOR gate 60 is 1. Thus, the output signals A and B of the respective OR gates 62 and 63 are both 1. As a result, the RAM 12 is put in the read mode, and the flip-flop 41 is disabled for latch operation because the clock signal A remains 1.

The output signal a of the RS flip-flop 55 is fed into the 4-bit shift register 57 where it is shifted in synchronism with the clock signal CK2. An output signal at the 4th output of the shift register 57 is applied to the D flip-flop 66, which latches the output signal in synchronism with the clock signal CK2 to provide an output signal f to a D flip-flop 67 and an AND gate 68. The D flip-flop 67 latches the signal f in synchronism with the clock signal CK2 to provide its output signal g, which is the inverse of the signal f latched, to the other input terminal of the AND gate 68.

Since, as described above, the output signal a of the RS flip-flop 55 is 0 when the flag FLG is 0, all the outputs of the shift register 57 are 0. As a result, the output signal f of the D flip-flop 66 is 0, and the inverted output signal g of the D flip-flop 67, which latches the signal f, is 1. Thus, at this point the output signal h of the AND gate 68, which is applied to the D flip-flop 69 and the NOR gate 60, is 0.

The D flip-flop 69 latches the output signal h of the AND gate 68 in synchronism with the clock signal CK2 and provides the latched signal to one input terminal of the NOR gate 70. The other input terminal of the NOR gate 70 is connected to receive the output signal i of the D flip-flop 61. The output signal of the NOR gate 70 is applied to the reset terminals of the RS flip-flops 55, 71 and the shift register 57.

That is, since, when the flag FLG is 0, the output signal j of the D flip-flop 69 is 0 and the output signal i of the D flip-flop 61 is 0, the output signal k of the NOR gate 70 is 1. Thus, the reset signal is applied to the reset terminals of the RS flip-flops 55, 71 and the 4-bit shift register 57 is inactive (1). On the other hand, when the flag FLG is set to 1 at data write time or at data read time for maintenance, either the output signal d of the AND gate 59 or the output signal h of the AND gate 68 becomes to 1 (normally, the output signal d of the AND gate 59 becomes 1 first), and the write enable signal B for the RAM 12 or the clock signal A for the flip-flop 41 becomes to 0. Then, VPI/VCI data is written into the RAM 12 or output VPI/VCI data from the RAM is latched by the flip-flop 41. On the next positive-going edge of the clock signal CK2 the signal d or h is latched by the D flip-flop 61 or 69, causing the output signal k of the NOR gate 70 to becomes 0. When the output signal k of the NOR gate 70 becomes 0, the RS flip-flops 55, 71 and the shift register 57 are reset.

Next, the operation of the timing signal generator constructed as described above will be described with reference to timing diagrams shown in FIGS. 9 and 10.

Figure 9:
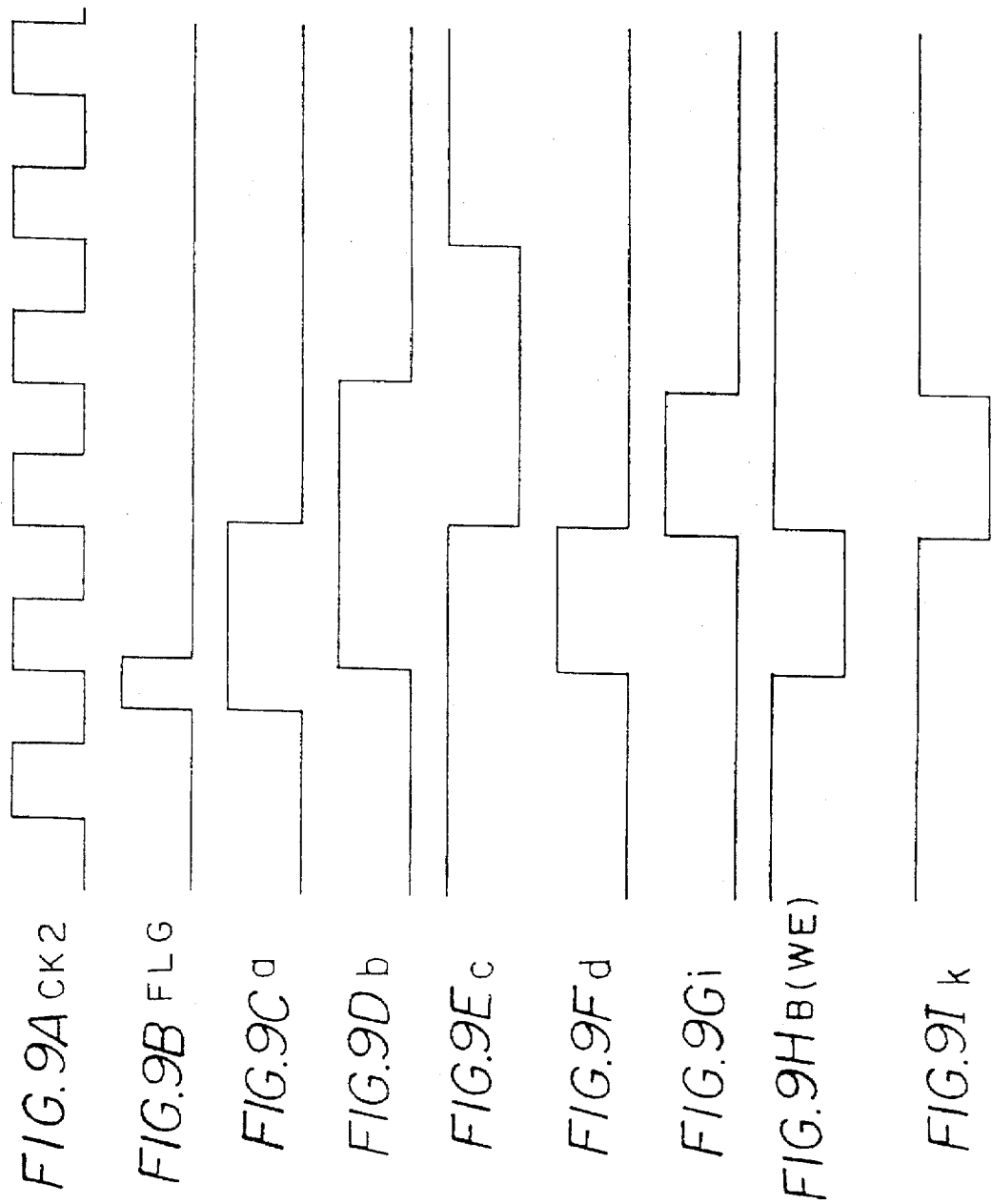
FIG. 9 is a timing diagram when no access is made by the line side.
Figure 10:
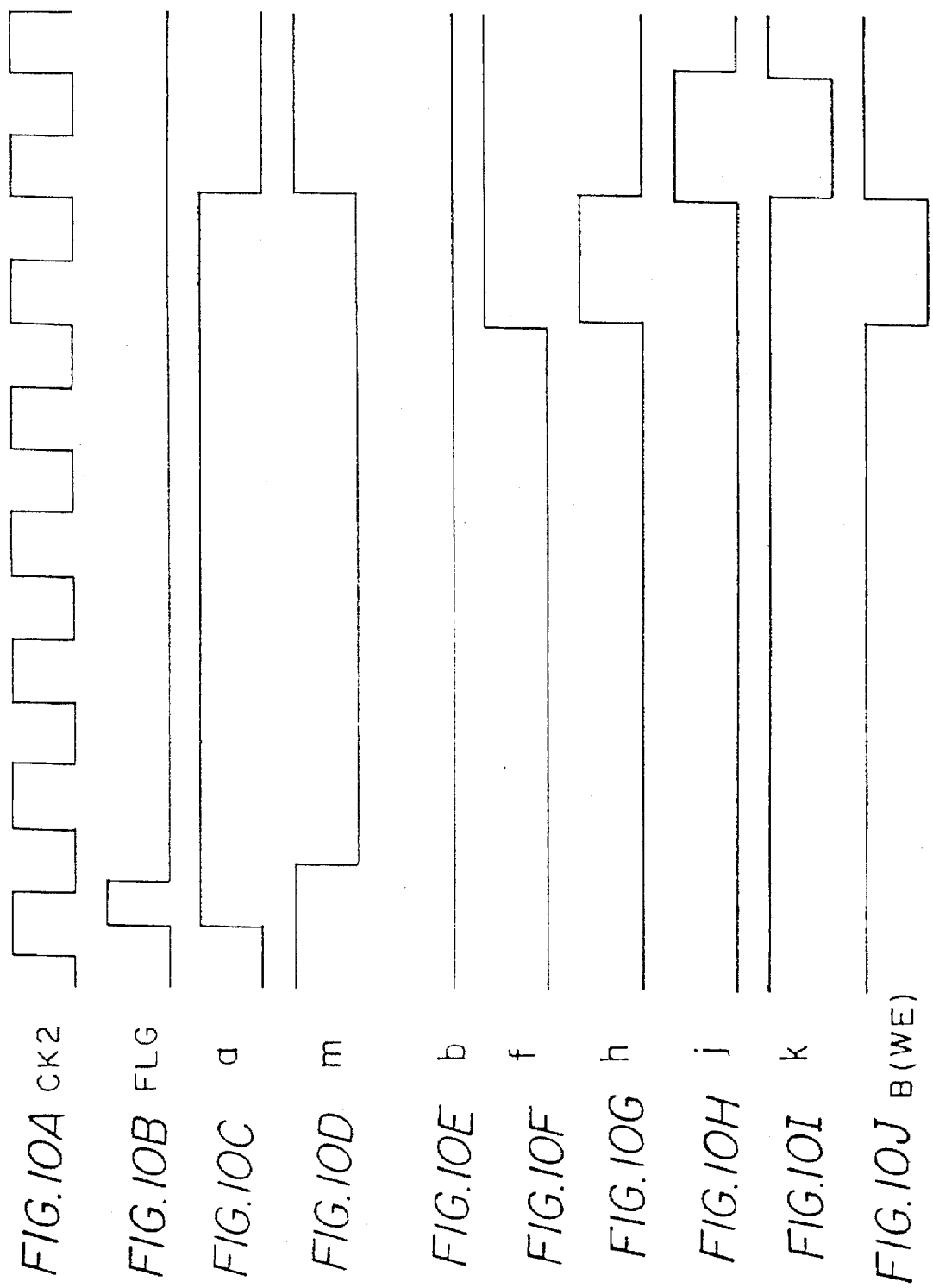
FIG. 10 is a timing diagram when both an access by the line side and a request for writing or reading for maintenance are made.

First, a reference is made to the timing diagram of FIG. 9 to describe the operation of writing data into the VCC table and reading data from the table for maintenance when no access is made by the line side. To write into or read from the VCC table, a write/read address is set first and the flag FLG is set to 1 next.

When the flag FLG is set to 1, the RS flip-flop 55 is set to 1, so that its output signal a becomes 1. Then, the output signal b of the D flip-flop 56 becomes 1 in synchronism with the positive-going transition of the clock signal CK2. Since, at this point, the inverted output signal c of the succeeding D flip-flop 58 is 1, the output signal d of the AND gate 59 becomes 1, causing the output signal of the NOR gate 60 to becomes 0.

If the current access to the VCC table is made for the purpose of writing data, then the R/W signal will be 0. Thus, the output signal A of the OR gate 62, i.e., the clock signal A applied to the clock terminal CK of the flip-flop 41 remains 1, while the output signal B of the OR gate 63, i.e., the write enable signal WE, changes from 1 to 0. This allows data to be written into RAM 12.

At the next positive-going transition of the clock signal Ck2, the output signal c of the D flip-flop 58 is changed from 1 to 0. As a result, the output signal d of the AND gate 59 becomes 0, causing the output signal B of the OR gate 63 to change from 0 to 1. That is, the write enable signal WE becomes active (0) for one cycle period of the clock signal CK2, thereby permitting VPI/VCI data to be written into the RAM 12.

At the next positive-going transition of the clock signal CK2 following the transition of the output signal d of the AND gate 59 from 0 to 1, the output signal i of the D flip-flop 61 becomes 1, which causes the output signal k of the NOR gate 70 to become 0. As a result, the RS flip-flop 55 is reset, whereby a single write operation on the RAM 12 is terminated.

If, on the other hand, the current access to the VCC table is made to read VPI/VCI data for the purpose of maintenance, then the R/W signal will be 1. In this case, the output signal B of the OR gate 63 remains 1. Instead, the output signal A of the OR gate 62 is changed from 1 to 0 for one cycle period of the clock signal CK2. At the positive-going transition of the signal A, output VPI/VCI data read from the RAM 12 is latched by the flip-flop 41. In this case, as in the case of data writing described above, the output signal k of the NOR gate 70 becomes 0 at the next positive-going transition of the clock signal CK2 following the transition of the output signal d of the AND gate 59 from 0 to 1, causing the RS flip-flop 55 to be reset, thereby terminating a data read operation for the RAM.

Next, the operation when a request for VCC table access by the line side and a request for data write or data read for maintenance occur exactly or almost simultaneously will be described with reference to the timing diagram of FIG. 10.

When the cell frame synchronization signal CF of a cell traveling over the line becomes 0, the output signal e of the AND gate 52 becomes 0, which puts the RS flip-flop 71 in the set state. As a result, the inverted output signal m of the RS flip-flop 71 becomes 0, causing the flip-flops 56 and 58 to be reset.

Thus, the output signal d of the AND gate 59 remains 0, and the output signals A and B of the OR gates 62 and 63 remain 1 even if the flag FLG has been set to 1. That is, when a request to access the VCC table is made by the line side, the D flip-flops 56 and 58 and the 4-bit shift register 57 are placed in the reset state. Thus, the write enable signal B or the clock signal A which causes the flip-flop 41 to latch data will not becomes 0 even if the access request by the line side is preceded by a write request or read request for maintenance, thereby allowing the access request made by the line side to be serviced by priority all the time.

It is to be noted that, when a request to write into the VCC table or read from it for the maintenance purpose is made exactly or almost simultaneously with a request to access the VCC table made by the line side, the data writing into the VCC table or data reading from it is performed after a lapse of a fixed time interval (in this embodiment, the time it takes to shift a flag signal FLG at 1 four bit positions in the 4-bit shift register 57).

When the flag FLG is set and the output signal a of the RS flip-flop 55 becomes 1, the signal a is shifted in the shift register 57 one bit position with each clock pulse CK2, and the fourth output of the register becomes 1 on the fourth clock pulse. At the next positive-going transition of the clock signal CK2, i.e., at the positive-going transition of the fifth clock pulse of the clock signal CK2, the output signal f of the D flip-flop 66 becomes 1. At this point the inverted output signal g of the D flip-flop 67 has been 1. Thus, both the inputs of the AND gate 68 are 1, causing its output signal h to become 1. If, in this case, the R/W signal is 0 to indicate data write, then the output signal B of the OR gate 63, i.e., the write enable signal WE, goes to 0, allowing VPI/VCI data to be written into the RAM 12. If, on the other hand, the R/W signal is 1 and the access request is made to read data from the RAM for the maintenance purpose, the output signal A of the OR gate 62 will becomes 0. When the signal A changes to 1 at the positive-going transition of the next clock pulse of the clock signal CK2, VPI/VCI data read from the RAM 12 is latched by the flip-flop 41.

After the writing into the VCC table or the reading from it for the maintenance purpose is terminated, the output signal j of the D flip-flop 69 becomes 1 at the positive-going edge of the next clock pulse CK2, allowing the reset signal k to be output from the NOR gate 70 to the RS flip-flops 55 and 71.

That is, the RS flip-flop 71, etc. serve as circuitry which, in order to service a request to data reading from VCC table made by the line side by priority to a request to write into the table or to read from it for maintenance purpose when they occur exactly or almost simultaneously, keeps the D flip-flops 56 and 58 in the reset state while the access request by the line side is processed. The shift register 57, the D flip-flops 66 and 67, and the AND gate 68 serve as circuitry which allows the VCC table to be written into or read from for maintenance purpose after the access by the line side has been terminated (in the embodiment, after a lapse of four cycle periods of the clock signal CK2).

To summarize the above circuit operation, if a read request by the line side occurs in the case where writing into the VCC table or reading from it for maintenance purpose has been instructed and hence the flag FLG has been set to 1, the writing into the VCC table or the reading from it is interrupted and the access by the line side is serviced first. After a lapse of a fixed time interval during which time the access by the line side is serviced (in the embodiment, the four clock periods during which time the four-bit shift is performed in the shift register 57), the write enable signal B (WE) or the read control signal A for maintenance is output.

The present embodiment, which allows the VCC table to be written into or read from for maintenance purpose on the basis of the clock signal CK2 generated independently of the clock signal CK1 extracted from cells traveling over a line, can make sure that the VCC table is normal and read data from the table for the maintenance purpose even if no line is installed or if there is a failure in the line.

By performing writing into the VCC table or reading from it using the clock signal CK2 which is different from the clock signal CK1 extracted from incoming cells in that way, there arises the possibility that a clock CK2-based access request for the VCC table and an access request by the line side to the table for conversion of VPI/VCI of an incoming cell may occur simultaneously. Even in such a case, the present embodiment precedes the VCC table access request by the line side and allows the VCC table to be written into or read from for maintenance purpose during a time interval which elapses from the termination of the access request by the line side before the next cell arrives, thus eliminating delays for connections resulting from a wait for conversion of VPI/VCI data for switching.

Next, a second embodiment of the present invention will be described with reference to FIGS. 11 and 12 which respectively illustrate a VPI/VCI data write circuit and a circuit for nullifying data in registers.

Figure 2:
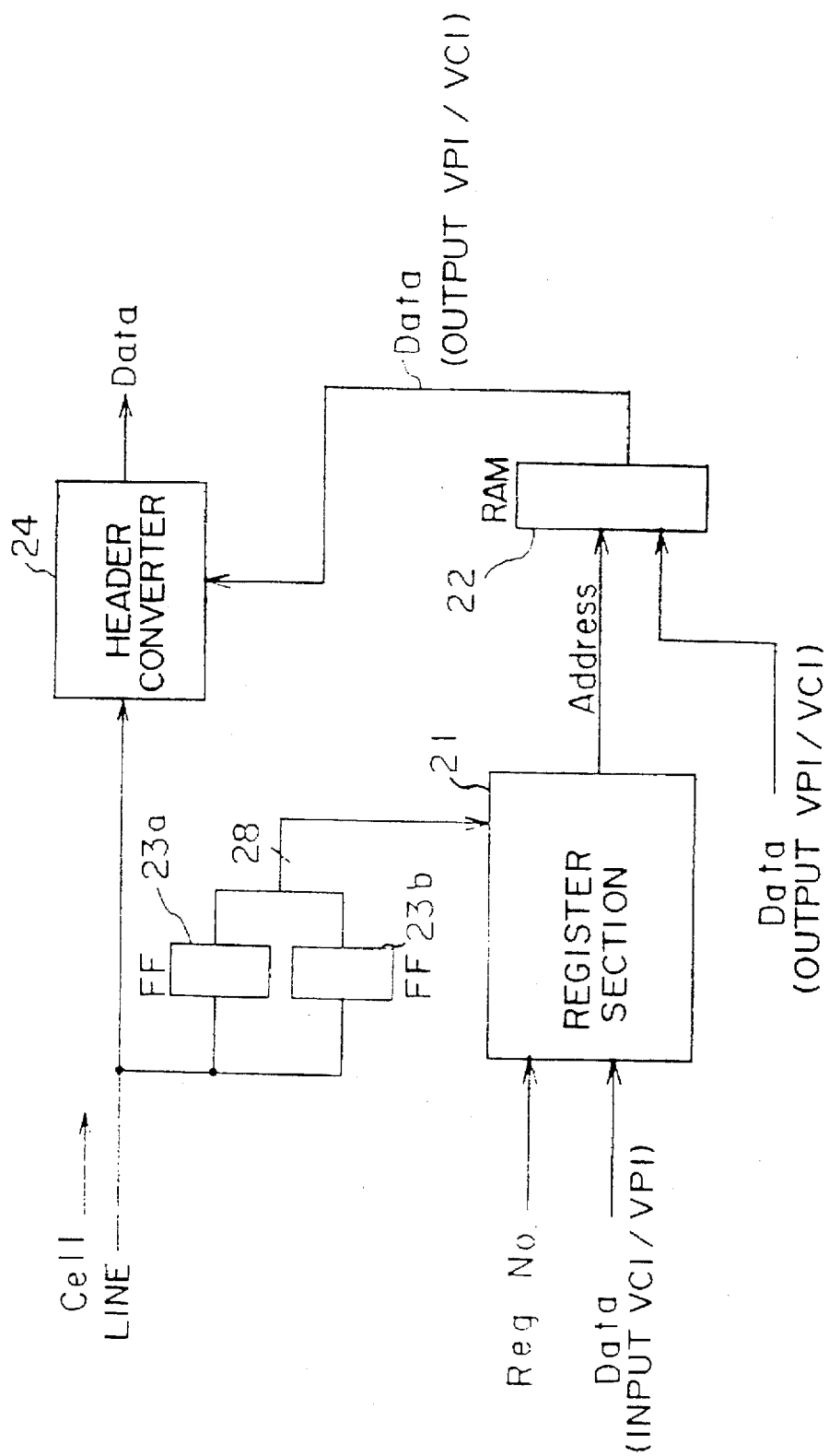
FIG. 2 is a block diagram of the main portion of another conventional virtual channel converter.
Figure 3:
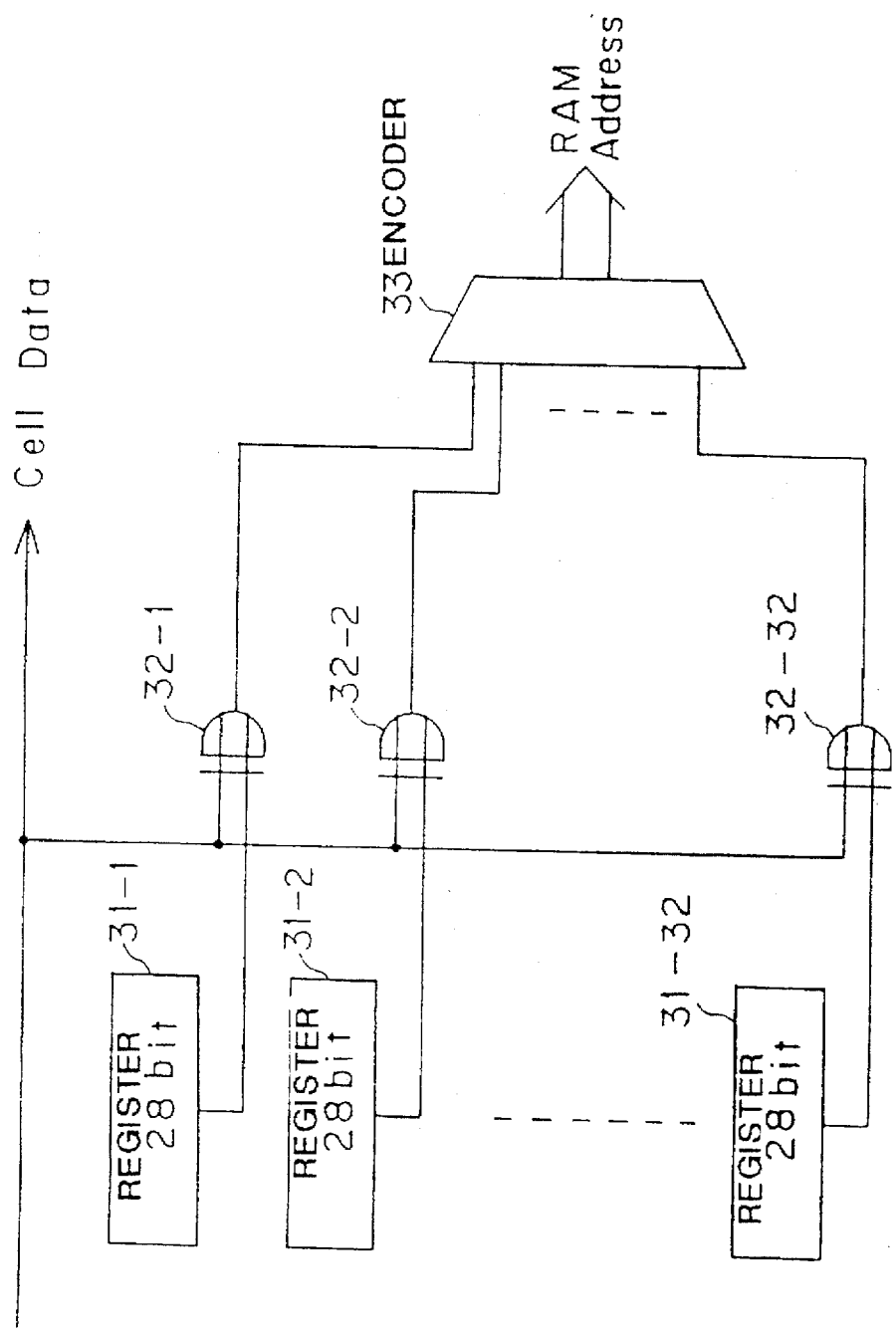
FIG. 3 illustrates an arrangement of the register section of FIG. 2.

According to this embodiment writing VPI/VCI data into the register section 21 (see FIG. 2) at the time of setup of a path and clearing VPI/VCI data in the register section 21 at the end of communication, which were conventionally performed by firmware can be changed into directly writing them to free registers and clearing them by hardware by providing busy/free indicating registers 85-1 to 85-32 corresponding to busy/free indicating information storage unit 38 which indicate that individual registers in the register section 21 are busy or free.

Figure 11:
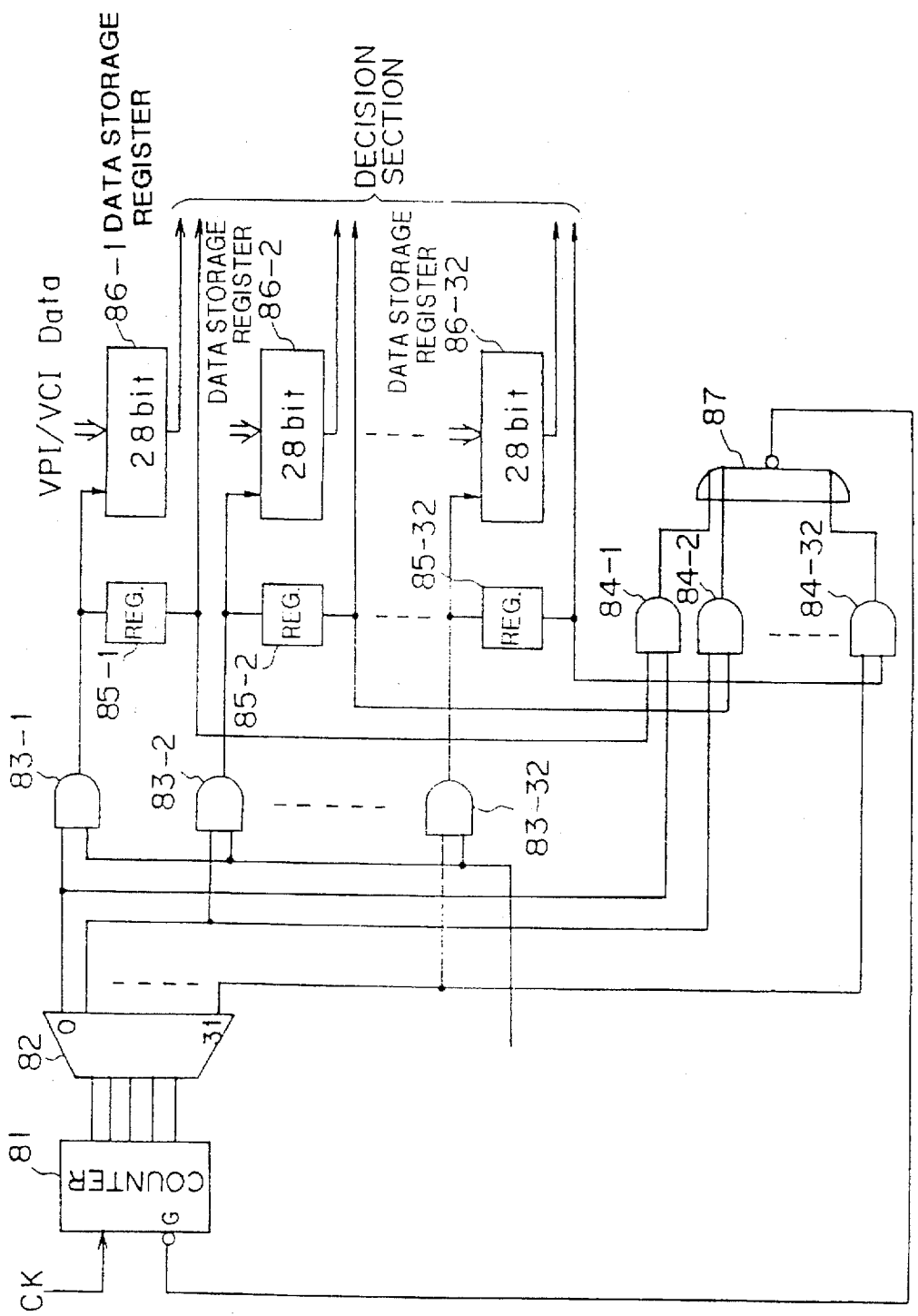
FIG. 11 illustrates an arrangement of a VPI/VCI data write circuit.

In FIG. 11, a 5-bit counter 81, which counts up by a clock signal CK, provides its count to a selector (decoder) 82. The selector 82 has 32 outputs and is responsive to count data from the counter 81 to select one out of its 32 outputs, the selected one being made 1 and the non-selected ones being made 0. Each of the 32 outputs of the selector 82 is connected to a respective one of 32 AND gates 83-1 to 83-32 and 32 AND gates 84-1 to 84-32.

A data write signal is applied to the other input terminals of the AND gates 83-1 to 83-32 the outputs of which are connected to the busy/free indicating registers 85-1 to 85-32, respectively. Each of the registers 85-1 to 85-32 stores 1-bit data which indicates that a corresponding one of the 28-bit registers 86-1 to 86-32 (corresponding to the VPI/VCI storage unit 37 in FIG. 5) is busy or free. Each of those registers stores input VPI/VCI data of an incoming cell. The 1-bit data is 0 when the corresponding register is busy, while it is 1 when the corresponding register is free.

When the corresponding resister is busy, the output signals of the registers 85-1 to 85-32 are respectively connected to AND gates 84-1 to 84-32. The output signals of the AND gates 84-1 to 84-32 are connected to a NOR gate 87 having 32 input terminals, and a determiner comprising exclusive OR gates 91-1 to 92-32, etc. shown in FIG. 12. The output signal of the NOR gate 87 is connected to the control terminal G of the counter 81 to control a counting operation.

Here, a description is made of the operation of writing VPI/VCI data into the registers 86-1 to 86-32 at the time of setup of a path. The counter 81 always counts from 0 up to 31. In response to a count in the counter, the corresponding one of the 32 outputs of the decoder 82 is made 1.

In response to this, one input of the corresponding one 84-i of the AND gates 84-1 to 84-32 becomes 1. If, at this point, the value in the corresponding register 85-i applied to the other input of the AND gate 84-i is 0, in other words, the register 86-i is busy, then the output of the AND gate 84-i will be 0, allowing the output of the NOR gate 87 to be 1.

When the output of the NOR gate 87 is 1, the counter 81 continue to count, so that it is incremented by one. Thereby, the selector 82 makes the input of the next AND gate 84-i+1 1. The above operation is repeated until a busy/free indicating register 85-i that has a value of 1 is found, in other words, a free VPI/VCI register is found.

Suppose now that the kth VPI/VCI register 86-k is free. Then, the value in the kth busy/free indicating register 85-k will be 1. In this case, when the kth output of the decoder 82 becomes 1, the output of the kth AND gate 84-k becomes 1. In response to this, the output of the NOR gate 87 becomes 0, thereby stopping the count operation of the counter 81.

As a result, the decoder 82 enables the kth AND gate 83-k continuously. A write signal which is entered while the AND gate 83-k is being enabled will allows the kth VPI/VCI register 86-k to be written with incoming VPI/VCI data. At the same time, the contents of the kth busy/free indicating register 85-k is changed from 1 to 0.

If, in the above circuit arrangement, the VPI/VCI registers 86-1 to 86-32 are all busy, the count operation of the counter 81 will be repeated, and the operation of searching for an empty register will be repeated. To solve this problem, the output signals of the busy/free indicating registers 85-1 to 85-32 are ANDed. A circuit should be provided to restrict the writing of VPI/VCI data when all the registers are busy.

As described above, the present embodiment is provided with the free/busy indicating registers 85-1 to 85-32 each corresponding with the respective VPI/VCI data storage registers 86-1 to 86-32 to allow hardware to detect a free VPI/VCI register among the registers 85-1 to 85-32 so that VPI/VCI data can be written into the detected register. Therefore, the present embodiment, unlike the prior art, eliminates the need of examining the contents of the VPI/VCI data storage registers 86-1 to 86-32 in sequence to search for an empty register, allowing the time it takes to write VPI/VCI data to be reduced.

Next, a circuit for making invalid VPI/VCI data set in a register at the termination of a call will be described with reference to FIG. 12. In this figure, the registers 86-1 to 86-32 and the registers 86-1 to 86-32 are identical to those in FIG. 11. The circuit of FIG. 11 and the circuit of FIG. 12 form one circuit.

Figure 12:
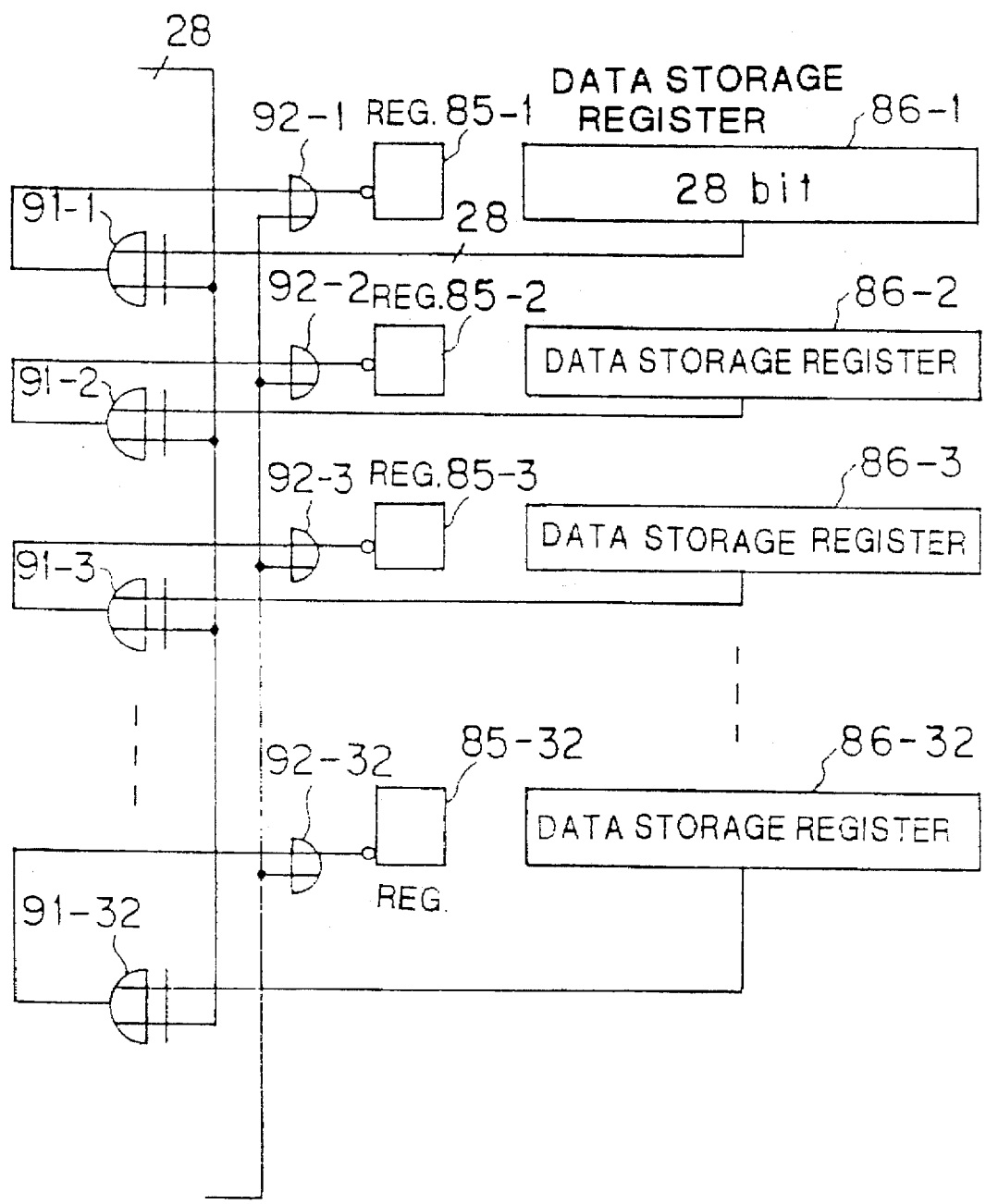
FIG. 12 shows a circuit arrangement for nullifying data in registers.

In FIG. 12, each of EXCLUSIVE OR gates (EXORs) 91-1 to 91-32 is connected at one input to receive 28-bit VPI/VCI data stored in a corresponding one of the registers 86-1 to 86-32 and at the other input to receive VPI/VCI data to be nullified. Each of the EXORs serves as a coincidence circuit which detects whether two inputs are equal. When two inputs are equal, it produces 0; otherwise, it produces 1.

The outputs of the EXORs 91-1 to 91-32 are connected to OR gates 92-1 to 92-32 at their one input. The OR gates are connected at their other input to receive a nullification specifying signal which is 0 when VPI/VCI data is nullified. The outputs of the OR gates 92-1 to 92-32 connected to the busy/free indicating registers 85-1 to 85-32, respectively. When an output signal of each OR gate becomes 0, the contents of the corresponding busy/free indicating register are changed to 1.

When, at the termination of a call, VPI/VCI data allocated to the call is erased from the VCC table, that VPI/VCI data is output as VPI/VCI data to be nullified. Then, in the EXORs 91-1 91-32, a decision is made as to whether or not the VPI/VCI data to be nullified coincides with VPI/VCI data in the registers 86-1 to 86-32.

For example, suppose that two inputs of the kth EXOR 91-k coincide. Then, its output will become 0. At this point the nullification specifying signal is also 0. Thus, the output of the OR gate 92-k is also 0. As a result, the contents of the busy/free indicating register 85-k is changed from 0 to 1, whereby the kth register 86-k is write enabled.

According to the above circuit, in order to nullify VPI/VCI data set in one of the registers 86-1 to 86-32 at the termination of a call, it is necessary only that the VPI/VCI data be specified, whereby the contents of the corresponding busy/free indicating register 85-i is rewritten by data indicating that the corresponding register 86-i is free and the corresponding register 86-i is write enabled. Therefore, unlike the prior art, the present embodiment eliminates the need of examining the contents of the registers in sequence and clearing the contents of a register which coincide data to be nullified, allowing the time taken to erase unnecessary VPI/VCi data to be reduced.

According to the second embodiment of the present invention, as described above, the provision of the busy/free indicating registers 85-1 to 85-32 allows an empty register and a register in which data to be nullified is stored to be detected through the use of hardware. Thus, the time taken to write VPI/VCI data into a register and the time taken to erase unnecessary data in a register can be reduced more than in the prior art.

Further, since the present embodiment is not based on firmware, the need for a ROM or RAM for storing programs is eliminated and cost is thus lowered.

Note that the present invention can be applied not only to the virtual channel converter as described above but also to a data access device for converting data using a conversion table and a data conversion method therefor. Moreover, the data conversion circuit of the present invention can be implemented by various circuits other than a timing signal generator, which is constructed from shift registers, D flip-flops, etc., and the like.

The present invention, which writes VPI/VCI data into a conversion table, e.g., a VCC table, and reads VPI/VCI data from it for the maintenance purpose on the basis of a clock signal other than a clock signal extracted from cells traveling over a line, can make sure that the VCC table is normal and read VPI/VCI data from the table for maintenance even when a line is not connected or in the event of a line failure.

Moreover, when a request to read from the VCC table by the line side and another request to access the table occur exactly or almost simultaneously, the present invention services the request by the line side by priority and then services the other access request during a time interval which elapses before the next cell arrives, eliminating the need for the VPI/VCI conversion request by the line side to be kept waiting. This allows delays for switching processing to be eliminated.

Furthermore, the provision of busy/free indicating information storage elements adapted to indicate whether VPI/VCI storage elements are busy or free and hardware adapted to detect an empty VPI/VCI storage element and to nullify or erase VPI/VCI data in a VPI/VCI storage element which has become unnecessary as a result of the termination of a call allows the time taken to write VPI/VCI data and the time taken to erase VPI/VCI data to be reduced.

What is claimed is:

1. A data access device for writing or reading data on the basis of a first clock signal extracted from an incoming cell being sent over a line, comprising:

storage means for storing a data conversion table;

clock signal generating means for generating a second clock signal which is different from said first clock signal extracted from the incoming cell on the line; and write/read control means for writing or reading data into or from said data conversion table when a request for access to said data conversion table is made by other than the line side on the basis of said second clock signal, wherein said data conversion table for which access is requested by other than the line side can always be accessed on the basis of said second clock signal independently of whether or not failure has occurred in said line.

2. The data access device according to claim 1, wherein:

said data access device is a virtual channel converter which is used in an asynchronous transfer mode switched network to convert an input virtual path identifier/virtual channel identifier added to an incoming cell on said line to an output virtual path identifier/virtual channel identifier;

said data conversion table is a virtual channel converter table that associates input virtual path identifier/virtual channel identifier data added to incoming cells with output virtual path identifier/virtual channel identifier data; and said write/read control means writes virtual path identifier/virtual channel identifier data into or reads virtual path identifier/virtual channel identifier data for maintenance from said virtual channel converter table when a request to write data into or read data for maintenance from said virtual channel converter table is made on the basis of said first clock signal or said second clock signal, if said line is normal, or on the basis of said second clock signal if a failure has occurred in said line.

3. The data access device according to claim 1, wherein:

when a request to read from said data conversion table by the line side with a request to write data into said data conversion table or a request to read data from said data conversion table by other than the line side are made, said write/read control means services said request to read from said data conversion table made by the line side by priority and then services said request to write data into said data conversion table or said request to read from said data conversion table by other than the line side on the basis of either said first clock signal or said second clock signal.

4. The data access device according to claim 2, wherein:

when a request to read virtual path identifier/virtual channel identifier data from said virtual channel converter table is made by the line side with a request to write virtual path identifier/virtual channel identifier data into said virtual channel converter table or a request to read virtual path identifier/virtual channel identifier data from said virtual channel converter table by other than the line side, said write/read control means services said request to write virtual path identifier/virtual channel identifier data into said virtual channel converter table made by the line side of priority and then writes virtual path identifier/virtual channel identifier data into said virtual channel converter table or reads virtual path identifier/virtual channel identifier data for maintenance from said virtual channel converter table.

5. The data access device according to claim 2, wherein said write/read control means comprising:

a decision circuit for deciding the presence or absence of a request to read from said virtual channel converter table made by the line side by detecting a cell frame synchronization signal; and a read/write control circuit responsive to a determination result of said decision circuit for, when said request to read by the line side is present, delaying the writing of data or the reading of data based on a request made by other than the line side by a fixed time interval and performs the reading of virtual path identifier/virtual channel identifier based on a request by other than the line side by priority.

6. A data access device as in claim 1, and for making access to data in response to an access request by line side and an access request by other than the line side, wherein said write/read control means, when a request for access to said conversion table by the line side occurs with a request for access to said conversion table by other than the line side, services said access request by the line side by priority and then services said access request by other than the line side during a time interval which elapses after said request by the line side has been serviced and before another access request is made by the line side.

7. A data access device comprising:

data storage means having a plurality of data storage sections for storing input data and output data with a correspondence therebetween;

busy/free indicating information storage means having a plurality of busy/free indicating information storage sections for storing information indicating that each of said corresponding data storage sections is busy or free; and control means for, when a request to write data is made, storing input data and output data defined for said input data into a data storage section of said data storage means, that corresponds to a busy/free indicating information storage section of said busy/free indicating information storage means in which information indicating free is stored and for, when a request to nullify data set in said data storage means is made, making a decision as to which data storage section of said data storage means stores data identical to data to be nullified and rewriting information in that busy/free indicating information storage section of said busy/free indicating information storage means, which corresponds to the data storage section which stores the data to be nullified by information indicating free.

8. The data access device according to claim 7, wherein:

said data access device is a virtual channel converter which is used in an asynchronous transfer mode switched network to convert an input virtual path identifier/virtual channel identifier added to an incoming cell on a line to an output virtual path identifier/virtual channel identifier;

said data storage sections of said storage means comprise virtual path identifier/virtual channel identifier storage sections that store input virtual path identifier/virtual channel identifier data in one-to-one correspondence with output virtual path identifier/virtual channel identifier data;

said busy/free indicating information storage sections in said busy/free indicating information storage means each store information indicating that the corresponding virtual path identifier/virtual channel identifier storage section is busy or free; and said control means, when a request to write data is made, writes input virtual path identifier/virtual channel identifier data into a virtual path identifier/virtual channel identifier storage section that corresponds to said busy/free indicating information storage section in which information indicating free is stored and establishes a correspondence between said input virtual path identifier/virtual channel identifier and output virtual path identifier/virtual channel identifier and, when a request to nullify virtual path identifier/virtual channel identifier which has been set is made, makes a decision as to which virtual path identifier/virtual channel identifier storage section stores data identical to said virtual path identifier/virtual channel identifier to be nullified and rewrites information in the corresponding busy/free indicating information storage section to that virtual path identifier/virtual channel identifier storage section which stores the virtual path identifier/virtual channel identifier to be nullified by information indicating free.

9. The data access device according to claim 8, wherein:

said data access device is a virtual channel converter which is used in an asynchronous transfer mode switched network to convert an input virtual path identifier/virtual channel identifier added to an incoming cell on said line to an output virtual path identifier/virtual channel identifier; and said control means writes virtual path identifier/virtual channel identifier data into or reads virtual path identifier/virtual channel identifier data for maintenance from said virtual path identifier/virtual channel identifier storage sections when a request to write data or read data for maintenance is made on the basis of either a first clock signal or a second clock signal if said line is normal, or on the basis of said second clock signal if a failure has occurred in said line.

10. The data access device according to claim 8, wherein said control means comprises:

a selector for selecting one of said busy/free indicating information storage sections;

a decision circuit for making a decision as to whether or not information in a busy/free indicating information storage section selected by said selector indicates being free; and a control circuit responsive to said decision circuit for, when the information in said busy/free indicating information storage section selected by said selector indicates being free, writing virtual path identifier/virtual channel identifier data to be set into the corresponding virtual path identifier/virtual channel identifier storage section to said busy/free indicating information storage section.

11. The data access device according to claim 8, wherein said control means comprises:

a counter;

a selector responsive to each count of said counter for selecting one of said busy/free indicating information storage sections;

a plurality of AND gates connected to receive output signals of said selector and output signals of said busy/free indicating information storage sections; and a circuit responsive to said AND gates for disabling said counter from counting when a busy/free indicating information storage section selected by said selector stores information indicating being free.

12. The data access device according to claim 8, wherein said control means comprises:

a decision circuit for making a decision as to whether or not virtual path identifier/virtual channel identifier data to be nullified matches virtual path identifier/virtual channel identifier stored in said virtual path identifier/virtual channel identifier storage sections; and a rewrite circuit responsive to said decision circuit and a nullification instructing signal input thereto from an external circuit for, when virtual path identifier/virtual channel identifier data in a virtual path identifier/virtual channel identifier storage section matches said data to be nullified, rewriting information in the corresponding busy/free indicating information storage section by information indicating free.

13. The data access device according to claim 12, wherein said decision circuit comprises a plurality of Exclusive OR gates, and said rewrite circuit comprises a plurality of OR gates.

14. A data access method for writing data into or reading data from a data conversion table on the basis of a first clock signal extracted from an incoming cell being transferred over a line, the method comprising the steps of:

writing data into or reading data from said data conversion table when a request for access to said data conversion table is made by other than the line side, on the basis of a second clock signal generated independently of said first clock signal, wherein said data conversion table for which access is requested by other than the line side can be always accessed on the basis of said second clock signal independently on whether or not failure has occurred in said line.

15. The data access method according to claim 14, wherein:

said conversion table is a virtual channel converter table which associates an input virtual path identifier/virtual channel identifier added to the incoming cell with an output virtual path identifier/virtual channel identifier, and wherein:

said method further comprises the steps of:

writing into or reading from said virtual channel converter table virtual path identifier/virtual channel identifier data, when only a request to write virtual path identifier/virtual channel identifier data into said table or a request to read virtual path identifier/virtual channel identifier data from said table for maintenance is made, on the basis of either said first clock signal or said second clock signal if said line is normal, and on the basis of said second clock signal when a failure has occurred in said line; and when a request to read virtual path identifier/virtual channel identifier data from said virtual channel converter table is made by the line side with a request to write virtual path identifier/virtual channel identifier data into or read virtual path identifier/virtual channel identifier data from said virtual channel conversion table, processing said request to read by the line side by priority and writing into or reading from virtual channel conversion table subsequently virtual path identifier/virtual channel identifier data on the basis of either said first clock signal or said second clock signal during a time interval that elapses after said request by the line side has been serviced before the next incoming cell arrives.

16. A data access device for reading data from a data conversion table based on a first clock extracted from a fixed length input packet sent from a line, the device comprising:

storage means for storing said data conversion table;

clock signal generating means for generating a second clock different from said first clock extracted from the fixed length input packet sent from the line; and data writing means for writing data based on said second clock in response to a data writing request to said data conversion table by other than the line.

17. A header conversion unit for converting a header of an inputted fixed length packet including a first clock into a new header, the unit comprising:

storage means for storing a header conversion table corresponding to inputted fixed length packet header information and outputted fixed length packet header information;

clock generating means for generating a second clock different from said first clock extracted from the inputted fixed length packet; and access means for accessing said header conversion table based on said first clock and converting said fixed length packet header information to new header information for the inputted fixed length packet and for writing header information by accessing said header conversion table based on said second clock in response to a header information writing request to said header conversion table by other than the line.

18. The header conversion unit according to claim 17, wherein:

said second clock generated by said clock generating means is asynchronous to said first clock.

19. A header conversion unit for converting a header of an inputted fixed length packet including a first clock into a new header, the unit comprising:

a storage means for storing a header converting table corresponding to inputted fixed length packet header information and outputted fixed length packet header information;

a clock generating means for generating a second clock different from said first clock extracted from the inputted fixed length packet; and a writing control signal generating means for generating and outputting a writing control signal based on said second clock when there is no inputted fixed length packet and there is a writing request to said header conversion table, terminating outputting, for a fixed period, said writing control signal when there is the inputted fixed length packet, executing header conversion with high priority to the inputted fixed length packet, and outputting the writing control signal based on said second clock until a next fixed length packet is inputted.

20. The header conversion unit according to claim 19, wherein said writing control signal generating means comprises:

a detecting circuit to detect whether or not there is an input of said fixed length packet by detecting a frame synchronous signal of the fixed length packet; and a prohibiting circuit for prohibiting outputting of the writing control signal for a fixed period, based on a result of said detecting circuit.

21. The header conversion unit according to claim 19, wherein said writing control signal generating means comprises:

a detecting circuit to detect whether or not there is an input of said fixed length packet by detecting a frame synchronous signal of the fixed length packet;

a latch circuit to latch a writing request signal to said header conversion table; and a shift register circuit, coupled to said latch circuit, for inputting the writing request signal latched by said latch circuit, shifting said second clock signal for a predetermined clock number, and outputting the writing control signal.

22. A header conversion unit for converting a header of an inputted fixed length packet to a new header, the unit comprising:

first storage means having a plurality of header conversion information storage portions corresponding to an inputted fixed length packet header information and an outputted fixed length packet header information;

second used/not-used information storage means having a plurality of used/not-used information storage portions for storing information designating whether or not each header conversion information storage portion of said first storage means is used corresponding to each respective header conversion information storage portion; and a control means for writing to the header conversion storage portion storing not-used information in a corresponding used/not-used information storage portion when there is a header information writing request to said header conversion information storage portion.

23. The header conversion unit according to claim 22, wherein said control means comprises:

a selector for selecting one of said plurality of used/not-used information storage portions;

a discrimining circuit for discriminating whether or not the used/not-used information storage portion selected in said selector is not used; and a writing control circuit for setting the header conversion information storage portion corresponding to the used/not-used information storage portion discriminated as being not used by said discriminating circuit, to be writable.

24. The header conversion means according to claim 22, wherein said control means comprises:

a counter;

a selector for selecting one of said plurality of used/not-used information storage portions in response to a count value of said counter;

a plurality of AND gates for inputting an output signal from said selector and an output signal of said used/not-used information storage portion selected by said selector; and a multiple input NOR gate for terminating a counting action of said counter when the used/not-used information storage portion is not used.

25. A header conversion unit for converting a header of an inputted fixed length packet to a new header, the unit comprising:

a first storage means having a plurality of header conversion information storage portions corresponding to inputted fixed length packet header information and outputted fixed length packet header information;

a second used/not-used information storage means having a plurality of used/not-used information storage portions for storing information designating whether or not each header conversion information storage portion of said first storage means is used corresponding to each respective header conversion information storage portion; and a control means for discriminating the header conversion information storage portion storing header information which should be invalidated when there is a header information invalidating request to said header converting information storage portion and for changing information in a corresponding used/not-used information storage portion into information designating not-used.

26. The header conversion unit according to claim 25, wherein said control means comprises:

a decision circuit for deciding coincidence between header information which should be invalidated and header information stored in a respective header conversion information storage portion; and a rewriting circuit for rewriting in a corresponding used/not-used information storage portion information designating not-used when coincidence is decided in said decision circuit and an invalidation designating signal is outputted.

* * * * *